(12) United States Patent
Kim

(10) Patent No.: US 10,351,126 B2
(45) Date of Patent: Jul. 16, 2019

(54) METHOD AND DEVICE FOR CONTROLLING MILD HYBRID ELECTRIC VEHICLE

(71) Applicants: HYUNDAI MOTOR COMPANY, Seoul (KR); KIA MOTORS CORPORATION, Seoul (KR)

(72) Inventor: YoungMin Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/829,157

(22) Filed: Dec. 1, 2017

(65) Prior Publication Data

US 2019/0126909 A1 May 2, 2019

(30) Foreign Application Priority Data

Oct. 26, 2017 (KR) .................. 10-2017-0140015

(51) Int. Cl.
| | | |
|---|---|---|
| *B60W 20/40* | (2016.01) | |
| *B60W 10/04* | (2006.01) | |
| *F02D 41/30* | (2006.01) | |
| *F02D 41/00* | (2006.01) | |
| *F02D 41/06* | (2006.01) | |

(Continued)

(52) U.S. Cl.
CPC ............ *B60W 20/40* (2013.01); *B60W 10/04* (2013.01); *B60W 10/06* (2013.01); *B60W 10/08* (2013.01); *B60W 20/10* (2013.01); *F02D 41/0025* (2013.01); *F02D 41/062* (2013.01); *F02D 41/30* (2013.01); *F02D 41/3094* (2013.01); *B60W 2540/10* (2013.01); *B60W 2710/0666* (2013.01)

(58) Field of Classification Search
CPC ...... B60W 20/40; B60W 20/10; B60W 10/04; B60W 10/06; B60W 10/08; B60W 2540/10; B60W 2710/0666; B60W 2710/0644; F02M 69/046; F02D 41/0025; F02D 41/062; F02D 41/30; F02D 41/3094
USPC ....................... 701/104; 123/431; 180/65, 28
See application file for complete search history.

(56) References Cited

U.S. PATENT DOCUMENTS

2016/0144852 A1* 5/2016 Nedorezov ........... B60W 10/06 701/22
2017/0174207 A1* 6/2017 Nishidono ............... B60K 6/24

FOREIGN PATENT DOCUMENTS

| JP | 2008-120266 A | 5/2008 |
|---|---|---|
| JP | 5790744 B2 | 10/2015 |
| KR | 10-2013-0061314 | 6/2013 |

* cited by examiner

*Primary Examiner* — Mahmoud Gimie
(74) *Attorney, Agent, or Firm* — Knobbe Martens Olson & Bear LLP

(57) ABSTRACT

A method for controlling a mild hybrid vehicle is provided. The methods includes: controlling, by a controller, a fuel system for supplying fuel to an engine to be changed to a system that simultaneously uses a gasoline direct injection fuel system and a multi-point injection fuel system based on a number of rotation of the engine and a load of the engine. The method further comprises operating, by the controller, a starter-generator so that torque of the engine operated by the gasoline direct injection fuel system and the multi-point injection fuel system becomes a demand torque of a driver of the mild hybrid vehicle when the demand torque of the driver is greater than a threshold value after the fuel system (Continued)

is changed to the system that simultaneously uses the gasoline direct injection fuel system and the multi-point injection fuel system.

7 Claims, 6 Drawing Sheets

(51) Int. Cl.
    *B60W 20/10*     (2016.01)
    *B60W 10/06*     (2006.01)
    *B60W 10/08*     (2006.01)

METHOD AND DEVICE FOR CONTROLLING MILD HYBRID ELECTRIC VEHICLE

CROSS-REFERENCE TO RELATED APPLICATION

This application claims priority to and the benefit of Korean Patent Application No. 10-2017-0140015 filed in the Korean Intellectual Property Office on Oct. 26, 2017, the entire contents of which are incorporated herein by reference.

BACKGROUND

(a) Field

The present disclosure relates to a mild hybrid vehicle (or a mild hybrid electric vehicle), and more particularly, to a method and a device for controlling a mild hybrid vehicle.

(b) Description of the Related Art

A hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The above information disclosed in this Background section is only for enhancement of understanding of the background of the invention, and therefore it may contain information that does not form the prior art that is already known in this country to a person of ordinary skill in the art. The disclosure of this section is to provide background of the invention. Applicant notes that this section may contain information available before this application. However, by providing this section, Applicant does not admit that any information contained in this section constitutes prior art.

SUMMARY

A mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

A hybrid vehicle may include a gasoline direct injection (GDI) engine for providing a high output and fuel economy in comparison with a comparable engine and a multi-point injection (MPI) engine with low vibration and noise and high durability.

The present disclosure has been made in an effort to a method for controlling a method and a device for controlling a mild hybrid vehicle which are capable of outputting a high torque that may not be obtained even when the vehicle operates its GDI fuel system and MPI fuel system simultaneously.

An embodiment of the present invention may provide the method for controlling the mild hybrid vehicle, including: controlling, by a controller, a fuel system for supplying fuel to an engine to be changed to a system that simultaneously uses a gasoline direct injection fuel system and a multi-point injection fuel system based on a number of rotation of the engine and a load of the engine; and operating, by the controller, a starter-generator so that torque of the engine operated by the gasoline direct injection fuel system and the multi-point injection fuel system becomes a demand torque of a driver of the mild hybrid vehicle when the demand torque of the driver is greater than a threshold value after the fuel system is changed to the system that simultaneously uses the gasoline direct injection fuel system and the multi-point injection fuel system.

The method for controlling the mild hybrid vehicle may further include: calculating, by the controller, the demand torque of the driver based on a position value of an accelerator pedal detected by an acceleration pedal position sensor.

The demand torque of the driver may be a change amount per unit time of the demand torque of the driver.

The method for controlling the mild hybrid vehicle may further include: operating, by the controller, the multi-point injection fuel system to start the engine.

The method for controlling the mild hybrid vehicle may further include: controlling, by the controller, the fuel system that supplies fuel to the engine to be changed to the gasoline direct injection fuel system fuel system when a number of rotation of the engine is greater than or equal to a reference speed after the multi-point injection fuel system is operated.

An embodiment of the present invention may provide the device for controlling the mild hybrid vehicle, including: a multi-point injection fuel system configured to supply fuel to an engine; a gasoline direct injection fuel system configured to supply fuel to the engine when a number of rotation of the engine is greater than or equal to a reference speed after the multi-point injection fuel system is operated; and a controller configured to control a fuel system for supplying fuel to the engine to be changed to a system that simultaneously uses the gasoline direct injection fuel system and the multi-point injection fuel system based on a number of rotation of the engine and a load of the engine. The controller may operate a starter-generator so that torque of the engine operated by the gasoline direct injection fuel system and the multi-point injection fuel system becomes a demand torque of a driver of the mild hybrid vehicle when the demand torque of the driver is greater than a threshold value after the fuel system is changed to the system that simultaneously uses the gasoline direct injection fuel system and the multi-point injection fuel system.

The controller may calculate the demand torque of the driver based on a position value of an accelerator pedal detected by an accelerator pedal position sensor.

The method and the device for controlling the mild hybrid vehicle according to embodiments of the present invention may control the engine to output the high torque that is required by the driver of the vehicle and is not output when the GDI fuel system and the MPI fuel system is simultaneously used using the starter-generator assisting torque of the engine.

DETAILED DESCRIPTION

Figure 1:
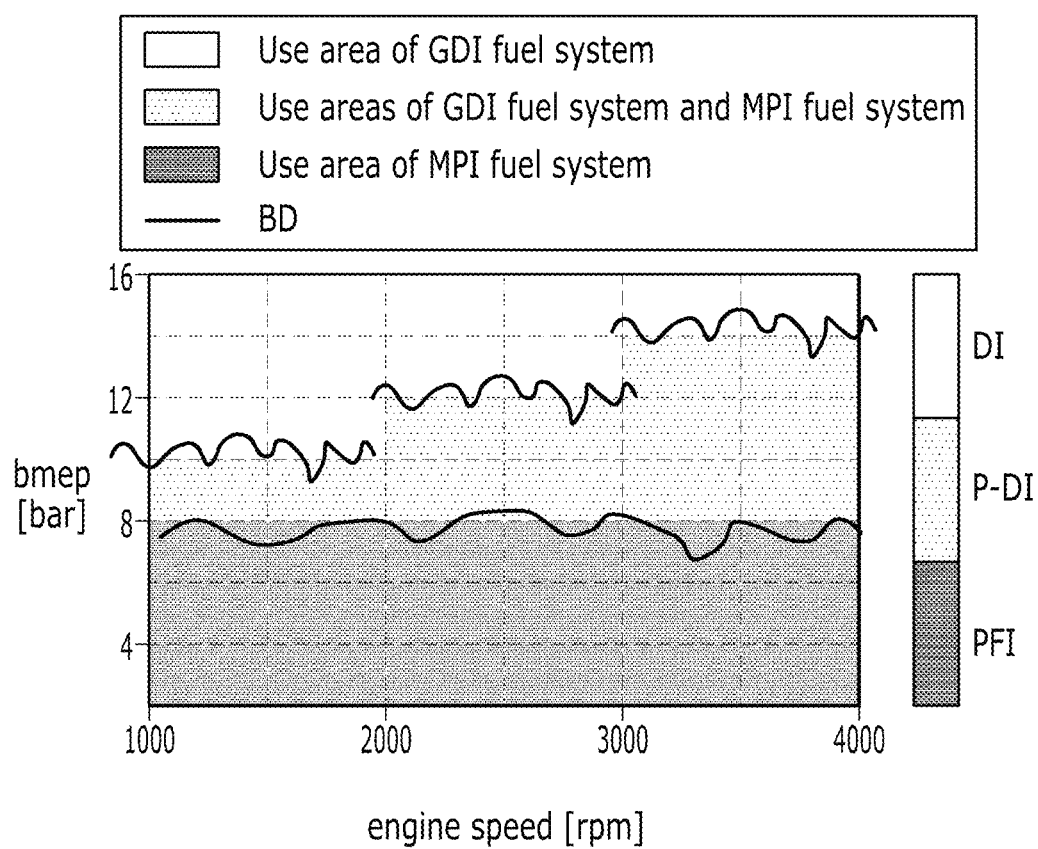
FIG. 1 is a view for explaining a use area of a fuel system according to an engine speed and an engine load.

In order to sufficiently understand embodiments of the present invention and advantages achieved by embodying the present invention, the accompanying drawings illustrating embodiments of the present invention and contents described in the accompanying drawings are to be referenced.

Hereinafter, embodiments of the present invention will be described in detail with reference to the accompanying drawings. In describing embodiments of the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Recently, a mild hybrid vehicle including a mild hybrid starter & generator (MHSG) that simultaneously uses a multi-point injection (MPI) fuel system (or a port fuel injection (PFI) fuel system) and a gasoline direct injection (GDI) fuel system (or a direct injection (DI) fuel system) has been developed.

A related art uses a multi-point injection (MPI) fuel system (or a port fuel injection (PFI) fuel system) at start of an engine, changes a fuel system to a gasoline direct injection (GDI) fuel system (or a direct injection (DI) fuel system) when revolutions per minute (RPM) of the engine rises to 1500 RPM after the engine start, and changes the GDI fuel system to the MPI fuel system or the GDI fuel system to a system that uses the GDI fuel system and the MPI fuel system simultaneously according to a use area of the fuel system based on the RPM of the engine and load of the engine.

A mild hybrid vehicle may not output a high horsepower torque when a use area of the fuel system according to a number of rotation (e.g., an engine RPM) of an engine and the engine load (e.g., brake mean effective pressure (BMEP)) shown in FIG. 1 during driving of the mild hybrid vehicle is a use area of a system that uses the GDI fuel system and the MPI fuel system simultaneously.

Specifically, when the GDI fuel system and the MPI fuel system are used simultaneously, horsepower of the engine of the mild hybrid vehicle may be, for example, a relatively small value of 380 horsepower. Since precise control for the engine is not performed in an idle region or a low flow quantity region of the vehicle when fuel quantity (or injection quantity) of an injector of the fuel system is increased for increasing the horsepower of the engine, emission of exhaust gas may increase.

An aspect of the invention provides a method for controlling a hybrid vehicle having two separate fuel supply systems for its combustion engine. For starting of the engine and a low RPM (lower than 1500) operation of the engine, a multi-point injection (MPI) system supplies fuel to the engine. When starting the vehicle, a motor/generator (MHSG) of the hybrid vehicle also operates in combination with the MPI system.

Subsequently, in response to the driver' input on an acerbation pedal (pushing the acerbation pedal to a first position, the vehicle uses a gasoline direct injection (GDI) system to supply fuel to the engine instead of the MPI system for a high RPM (higher than 1500) operation of the engine.

Subsequently, when the driver' pushes the acerbation pedal further to a second position, the vehicle activates MPI system gain to use both of the GDI system and the MPI system to supply fuel until the engine outputs a maximum torque from the combustion engine (without generating an assistant torque from the motor/generator). In embodiments, the vehicle use both of the GDI system and the MPI system to supply fuel until the engine reaches its maximum RPM in response to driver's pedal input to the second position.

Subsequently, when the driver pushes the acceleration pedal further to a third position or maintains the acceleration pedal at the second position (when the second position is the deepest position of the pedal), the vehicle activates its motor/generator (MHSG, 30) to generate additional torque in addition to the maximum torque from the combustion engine.

FIG. 1 is a view for explaining a use area of a fuel system according to an engine speed and an engine load according to a related art.

Referring to FIG. 1, the mild hybrid vehicle may frequently change the use area of the fuel system through a boundary region indicated by a reference symbol (BD). An area where an injector of the GDI fuel system and an injector of the MPI fuel system are used at the same time may not output high torque of the engine requested by the vehicle driver.

Figure 2:
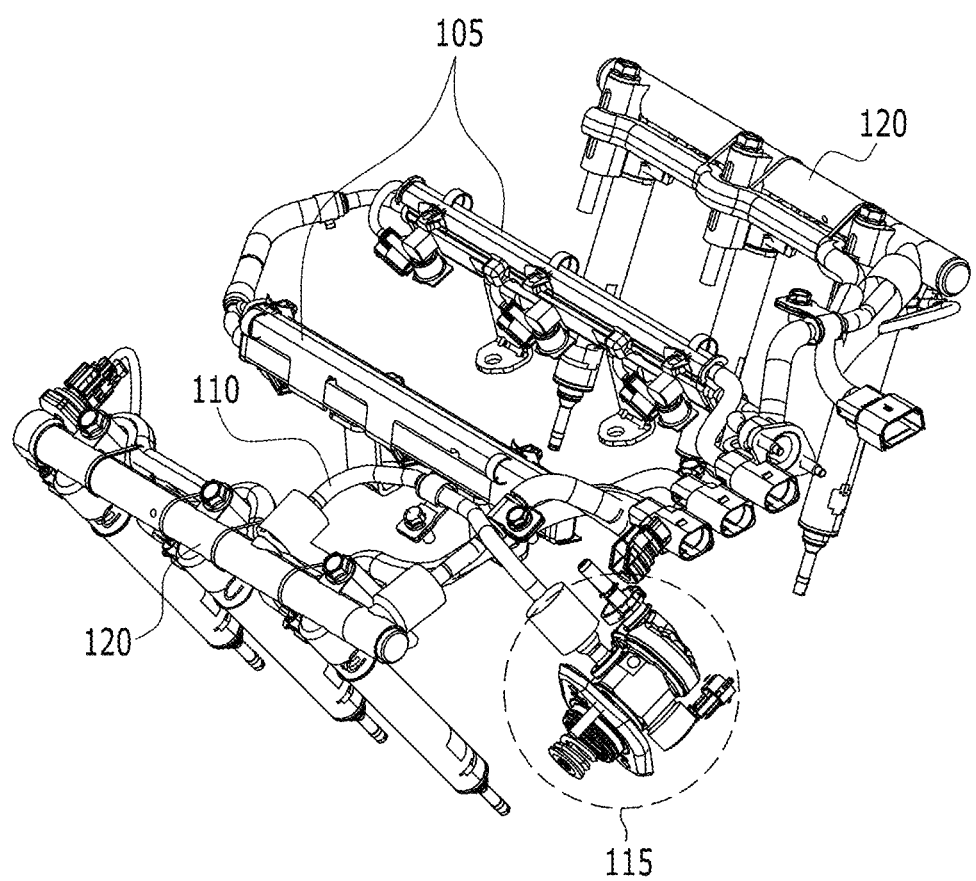
FIG. 2 is a perspective view illustrating a multi-point injection (MPI) fuel system and a gasoline direct injection (GDI) fuel system to which a method for controlling a mild hybrid vehicle according to embodiments of the present invention is applied.
Figure 3:
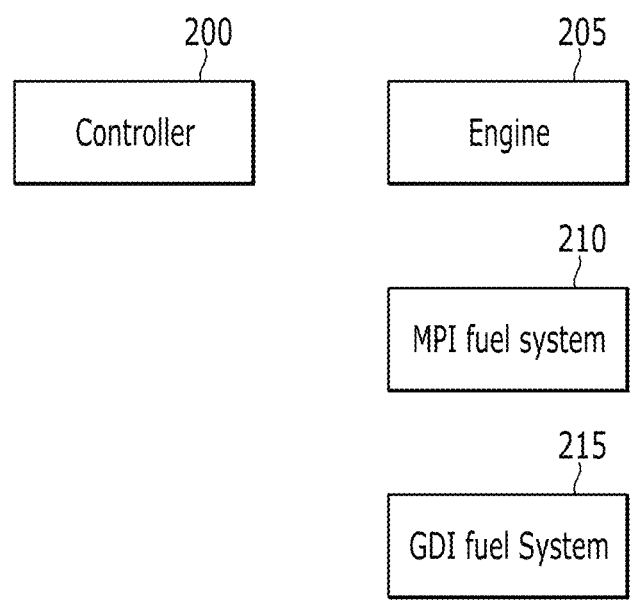
FIG. 3 is a block diagram illustrating a device for controlling a mild hybrid vehicle to which the method for controlling the mild hybrid vehicle according to embodiments of the present invention is applied.

FIG. 2 is a perspective view illustrating a multi-point injection (MPI) fuel system and a gasoline direct injection (GDI) fuel system to which a method for controlling a mild hybrid vehicle according to embodiments of the present invention is applied. FIG. 3 is a block diagram illustrating a device for controlling a mild hybrid vehicle to which the method for controlling the mild hybrid vehicle according to embodiments of the present invention is applied.

Referring to FIG. 2 and FIG. 3, the mild hybrid vehicle includes an MPI fuel system 210 including an MPI injector rail assembly 105, and a GDI fuel system 215 including a GDI injector rail assembly 120, a GDI high pressure pump 115, and a high pressure pipe 110 connecting the GDI injector rail assembly and the GDI high pressure pump.

A device for controlling the mild hybrid vehicle included in the mild hybrid vehicle may include a controller 200 including an electronic control unit (ECU) for controlling an engine 205, the MPI fuel system 210 that supplies a fuel (e.g., gasoline) to an intake manifold connected to the engine or an intake port of a cylinder head of the engine, and the GDI fuel system 215 that supplies fuel to a cylinder of the engine (or a combustion chamber of the engine).

The MPI fuel system (or a MPI fuel device) 210 may include an MPI injector that supplies fuel to the intake manifold connected to the engine 205 and is connected to the MPI injector rail assembly 105 (or a lower portion of the MPI injector rail assembly) and a low pressure fuel pump that pumps fuel to the MPI injector.

The GDI fuel system (or a GDI fuel device) 215 may include a GDI injector (or a GDI high-pressure injector) that supplies fuel to the combustion chamber of the engine 205 and is connected to the GDI injector rail assembly 120), the GDI high pressure fuel pump 115 pumping fuel to the GDI injector, a low pressure fuel pump pumping fuel to the GDI high pressure fuel pump 115, and a GDI high pressure fuel sensor detecting whether a pressure of a pipe connecting the GDI high pressure fuel pump and the low pressure fuel pump is high.

The controller 200 may control an operation of the MPI fuel system 210 and an operation of the GDI fuel system 215. For example, the controller 200 may output a control signal for controlling fuel injection timing to the injector included in the fuel system. The controller 200 may control an overall operation of the mild hybrid vehicle. For example, the controller 200 may be one or more microprocessors operated by a program or hardware including the microprocessor. The program may include a series of commands for executing the method for controlling the mild hybrid vehicle according to embodiments of the present invention. The commands may be stored in a memory.

Figure 4:
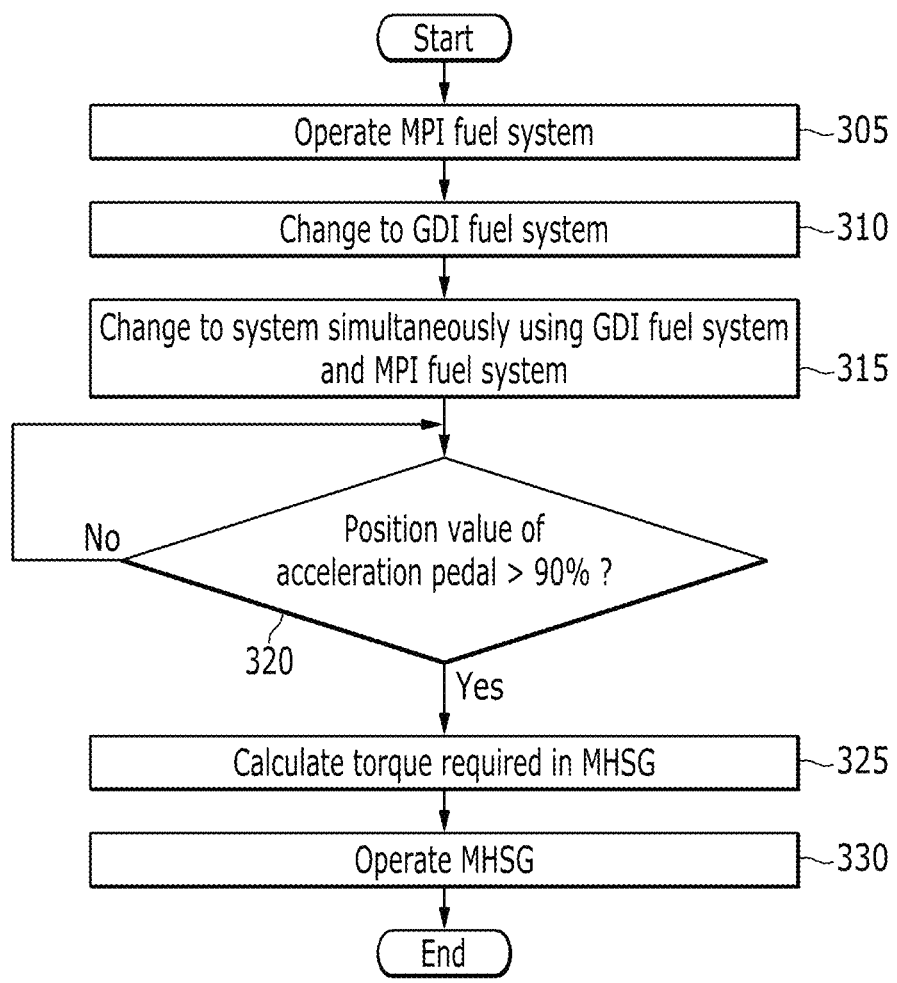
FIG. 4 is a flowchart illustrating the method for controlling the mild hybrid vehicle according to embodiments of the present invention.
Figure 5:
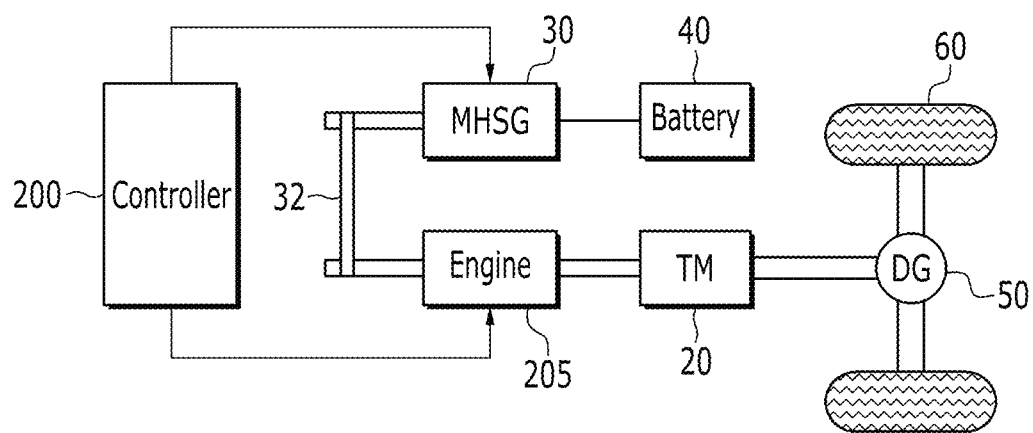
FIG. 5 is a block diagram illustrating a mild hybrid vehicle to which the method for controlling the mild hybrid vehicle shown in FIG. 4 is applied.

FIG. 4 is a flowchart illustrating the method for controlling the mild hybrid vehicle according to embodiments of the present invention. The method for controlling the mild hybrid vehicle may be applied to the device shown in FIG. 3. FIG. 5 is a block diagram illustrating a mild hybrid vehicle to which the method for controlling the mild hybrid vehicle shown in FIG. 4 is applied.

Referring to FIG. 2 to FIG. 5, in a start step 305, the controller 200 may control the MPI fuel system 210 supplying fuel to the engine 205 to be operated (or started) when a start key of the mild hybrid vehicle is turned. Also, the controller 200 may control the engine 205 to start by controlling a mild hybrid starter and generator (MHSG) 30.

The mild hybrid vehicle includes the engine 205, a transmission 20, the starter-generator (or the mild hybrid starter and generator) 30, a battery 40, a differential gear device 50, wheels 60, and the controller 200.

The engine 205 may convert chemical energy to mechanical energy by burning fuel and air. Torque of the engine 205 may be transmitted to an input shaft of the transmission 20, and torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. In addition, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a part performing functions of an alternator, the engine torque assist, or regenerative braking.

The starter-generator 30 may drive the engine 205 of the vehicle in a cranking and torque control mode of the vehicle (or the engine) and may generate electricity according to an output of the engine to charge the 48 V battery 40 in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery that is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a change step 310, when a number of rotation (e.g., an RPM) of the engine 205 is greater than or equal to a reference speed (e.g., 1500 RPM) after the MPI fuel system 210 is operated (or activated), the controller 200 may control the fuel system that supplies fuel to the engine 205 to be changed to the GDI fuel system 215. For example, the number of rotation of the engine 205 may be detected by the RPM sensor and may be provided to the controller 200.

Figure 6:
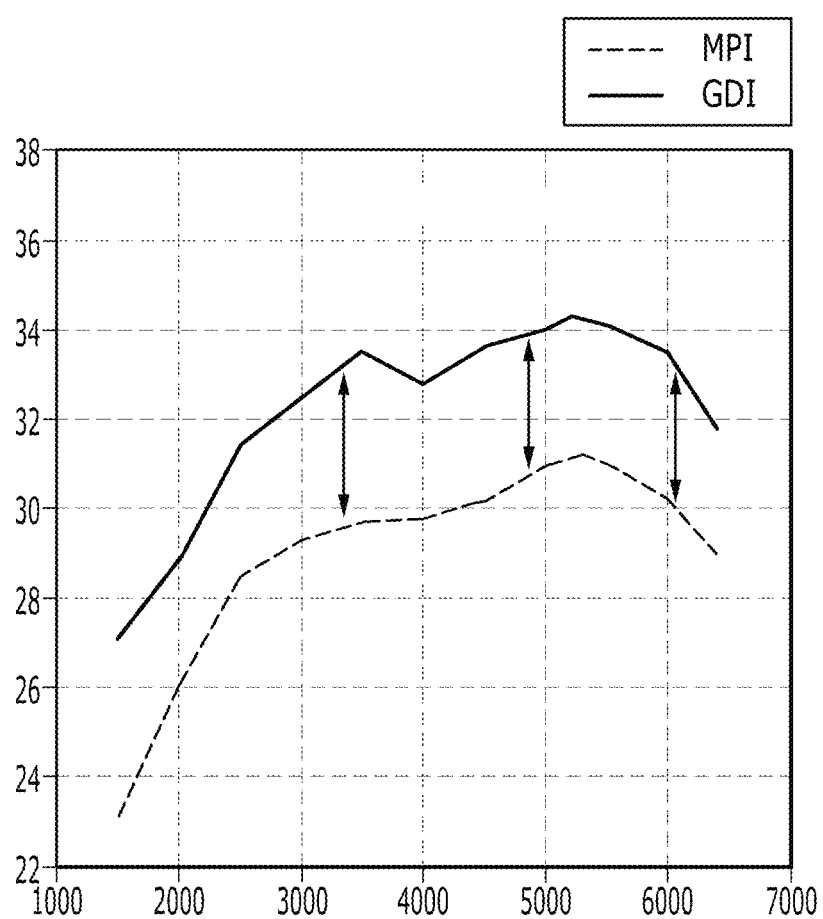
FIG. 6 is a graph for explaining the MPI fuel system and the GDI fuel system shown in FIG. 3.

As shown in FIG. 6, torque of the engine 205 when the GDI fuel system 215 is operated may be greater than torque of the engine when the MPI fuel system 210 is operated. In a graph of FIG. 6, a horizontal axis may indicate a RPM and a vertical axis may indicate a torque.

According to an entry step 315, the controller 200 may control a fuel system for supplying fuel to the engine 205 to be changed to a system that simultaneously uses the GDI fuel system 215 and the MPI fuel system 210 based on a number of rotation of the engine 205 and a load of the engine.

According to a determination step 320, after the fuel system is changed to the system (or a mode) that simultaneously uses the GDI fuel system 215 and the MPI fuel system 210, the controller 200 may determine whether a position value of an accelerator pedal detected by an acceleration pedal position sensor is greater than a position reference value (e.g., 90%). When the accelerator pedal is fully depressed, the position value of the accelerator pedal may be 100%. When the accelerator pedal is not depressed, the position value of the accelerator pedal may be 0%.

The controller 200 may calculate a demand torque of a driver of the mild hybrid vehicle based on the position value of the accelerator pedal and may determine whether the demand torque (e.g., the driver's demand torque change amount per unit time) of the driver is greater than a threshold value (e.g., 200 Nm). The threshold value may be a maximum torque value of the engine 205 that is output when the GDI fuel system 215 and the MPI fuel system 210 are used at the same time.

According to a calculation step 325, when the position value of the accelerator pedal is greater than the position reference value, the controller 200 including the ECU may calculate torque of the starter-generator 30 that causes torque of the engine 205 operated by the GDI fuel system 215 and the MPI fuel system 210 to become the demand torque of the driver.

According to an operation step 330, the controller 200 may control (or operate) the starter-generator 30 based on the torque of the starter-generator 30 so that the torque of the engine 205 operated by the GDI fuel system 215 and the MPI fuel system 210 becomes the demand torque of the driver.

The components, "~ unit", block, or module which are used in embodiments may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As set forth above, embodiments of the invention have been disclosed in the accompanying drawings and the specification. Herein, specific terms have been used, but are just used for the purpose of describing embodiments of the present invention and are not used for qualifying the meaning or limiting the scope of the present invention, which is disclosed in the appended claims. Therefore, it will be understood by those skilled in the art that various modifications and equivalent embodiments are possible from the present invention. Accordingly, scope of the present invention can be determined by the spirit of the claims.

DESCRIPTION OF SYMBOLS

30: MHSG
200: controller
205: engine
210: MPI fuel system
215: GDI fuel system

What is claimed is:

1. A method of controlling a hybrid vehicle, comprising:
   controlling, by a controller, a gasoline direct injection fuel system and a multi-point injection fuel system for supplying fuel to an engine such that the gasoline direct injection fuel system and the multi-point injection fuel system are simultaneously used depending on a rotational speed of the engine and a load of the engine; and
   operating, by the controller, a starter-generator to generate assist torque such that a sum of the assist torque and torque of the engine by simultaneous use of the gasoline direct injection fuel system and the multi-point injection fuel system meets a demand torque of a driver of the hybrid vehicle when the demand torque of the driver is greater than a threshold value while the gasoline direct injection fuel system and the multi-point injection fuel system are simultaneously used.

2. The method of claim 1, further comprising:
   calculating, by the controller, the demand torque of the driver based on a position value of an accelerator pedal detected by an acceleration pedal position sensor.

3. The method of claim 2, wherein the demand torque of the driver is a change amount per unit time of the demand torque of the driver.

4. The method of claim 1, further comprising:
   operating, by the controller, the multi-point injection fuel system to start the engine.

5. The method of claim 4, further comprising:
   controlling, by the controller, the gasoline direct injection fuel system to supply fuel to the engine when the rotational speed of the engine is greater than or equal to a reference speed while the multi-point injection fuel system is operated.

6. A device for controlling a hybrid vehicle, comprising:
   a multi-point injection fuel system configured to supply fuel to an engine;
   a gasoline direct injection fuel system configured to supply fuel to the engine when a rotational speed of the engine is greater than or equal to a reference speed while the multi-point injection fuel system is operated;
   a starter-generator configured to generate assist torque to be added to the engine's torque; and
   a controller configured to control a gasoline direct injection fuel system and a multi-point injection fuel system for supplying fuel to the engine such that the gasoline direct injection fuel system and the multi-point injection fuel system are simultaneously used depending on a rotational speed of the engine and a load of the engine,
   wherein the controller is configured to operate the starter-generator to generate the assist torque such that a sum of the assist torque and torque of the engine by simultaneous use of the gasoline direct injection fuel system and the multi-point injection fuel system meets a demand torque of a driver of the hybrid vehicle when the demand torque of the driver is greater than a threshold value while the gasoline direct injection fuel system and the multi-point injection fuel system are simultaneously used.

7. The device of claim 6, wherein the controller is configured to calculate the demand torque of the driver based on a position value of an accelerator pedal detected by an acceleration pedal position sensor.

* * * * *